United States Patent
Kwon

(10) Patent No.: US 10,141,618 B2
(45) Date of Patent: Nov. 27, 2018

(54) SYSTEM AND METHOD OF COOLING HIGH VOLTAGE BATTERY

(71) Applicant: HYUNDAI MOTOR COMPANY, Seoul (KR)

(72) Inventor: Mun Soon Kwon, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 447 days.

(21) Appl. No.: 14/956,035

(22) Filed: Dec. 1, 2015

(65) Prior Publication Data

US 2017/0018823 A1 Jan. 19, 2017

(30) Foreign Application Priority Data

Jul. 15, 2015 (KR) .......................... 10-2015-0100647
Sep. 24, 2015 (KR) .......................... 10-2015-0135158

(51) Int. Cl.
| | | |
|---|---|---|
| *H01M 10/48* | (2006.01) | |
| *H01M 10/613* | (2014.01) | |
| *H01M 10/625* | (2014.01) | |
| *H01M 10/633* | (2014.01) | |
| *H01M 10/663* | (2014.01) | |
| *H01M 10/6563* | (2014.01) | |

(52) U.S. Cl.
CPC ....... *H01M 10/633* (2015.04); *H01M 10/486* (2013.01); *H01M 10/613* (2015.04); *H01M 10/625* (2015.04); *H01M 10/6563* (2015.04); *H01M 10/663* (2015.04)

(58) Field of Classification Search
CPC ............. H01M 10/633; H01M 10/613; H01M 10/625; H01M 10/6563; H01M 10/663; H01M 10/486
See application file for complete search history.

(56) References Cited

U.S. PATENT DOCUMENTS 4,651,922 A * 3/1987 Noba ...................... F01P 7/026
123/41.12
5,488,938 A * 2/1996 Ohuchi ............... F02D 41/0055
123/568.16
(Continued)

FOREIGN PATENT DOCUMENTS

CN 103982289 A 8/2014
EP 1932707 A1 6/2008
(Continued)

OTHER PUBLICATIONS

Notice of Allowance dated May 17, 2017 issued in Korean Patent Application No. 10-2015-0135158.
(Continued)

*Primary Examiner* — Nicholas Kiswanto
(74) *Attorney, Agent, or Firm* — McDermott Will & Emery LLP

(57) ABSTRACT

A system and a method are capable of cooling a high voltage battery capable of maintaining a heat generation level of the high voltage battery in an optimal state by controlling a cooling fan motor on the basis of information on ignition of a vehicle and information on an operation of an air conditioner, when an error is generated in controller area network (CAN) communication with a battery management system (BMS).

18 Claims, 10 Drawing Sheets

(56) References Cited

U.S. PATENT DOCUMENTS

| | | | |
|---|---|---|---|
| 7,426,434 B2 * | 9/2008 | Asano | B60W 10/06 |
| | | | 701/109 |
| 2009/0260905 A1 | 10/2009 | Shinmura | |
| 2011/0118917 A1 | 5/2011 | Lim et al. | |
| 2014/0370333 A1 | 12/2014 | Kwon et al. | |

FOREIGN PATENT DOCUMENTS

| | | |
|---|---|---|
| JP | 05-043796 U | 6/1993 |
| JP | H05-043796 U | 6/1993 |
| JP | 2005262897 A | 9/2005 |
| JP | 2008153112 A | 7/2008 |
| JP | 2011105291 A | 6/2011 |
| JP | 2013015024 A | 1/2013 |
| JP | 5446307 B2 | 3/2014 |
| KR | 10-20070082273 A | 8/2007 |
| KR | 10-20080092688 A | 10/2008 |
| KR | 10-1000225 B1 | 12/2010 |
| KR | 10-2013-0064381 A | 6/2013 |
| KR | 10-1383260 B1 | 4/2014 |
| KR | 10-1428387 B1 | 8/2014 |
| KR | 10-1459902 B1 | 11/2014 |
| KR | 10-2014-0147171 A | 12/2014 |
| KR | 10-20150075870 A | 7/2015 |

OTHER PUBLICATIONS

Office Action Korean Patent Application No. 10-2015-0135158 dated Oct. 12, 2016.
Office Action Korean Patent Application No. 10-2015-0100647 dated Nov. 17, 2016.

* cited by examiner

| DIVISION | OUTPUT VALUE (VOUT) OF APT | BATTERY TEMPERATURE | DESCRIPTION OF STATE OF VEHICLE |
|---|---|---|---|
| MODE A | 1.5V | NORMAL TEMPERATURE | IGNITION IS TURNED ON AND AIR CONDITIONER IS TURNED OFF |
| MODE B | 1.5V ~ 4V | NORMAL TEMPERATURE | IGNITION IS TURNED ON AND AIR CONDITIONER IS TURNED ON |
| MODE C (ERROR MODE) | 0V or 5V | 75°C OR MORE | IGNITION IS TURNED ON (AIR CONDITIONER IS TURNED ON OR TURNED OFF) |

FIG.8

SYSTEM AND METHOD OF COOLING HIGH VOLTAGE BATTERY

CROSS-REFERENCE TO RELATED APPLICATIONS

This application is based on and claims the benefit of priority to Korean Patent Application No. 10-2015-0100647, filed on Jul. 15, 2015 and Korean Patent Application No. 10-2015-0135158, filed on Sep. 24, 2015 in the Korean Intellectual Property Office, the disclosures of which are incorporated herein in its entirety by reference.

TECHNICAL FIELD

The present disclosure relates to a system and a method of cooling a high voltage battery, and more particularly, to a technology capable of efficiently cooling a high voltage battery for an environmentally-friendly vehicle even when an error is generated in controller area network (CAN) communication through which information required for cooling the high voltage battery is transmitted.

BACKGROUND

An environmentally-friendly vehicle such as a hybrid electric vehicle (HEV), an electric vehicle (EV), a plug-in hybrid electric vehicle (PHEV), a fuel cell electric vehicle (FCEV), and the like, is mounted with a motor as a driving power source, and is mounted with a high voltage battery as a driving power source of the motor.

The environmentally-friendly vehicle is necessarily mounted with a system of cooling a high voltage battery for preventing overheat of the high voltage battery.

The system of cooling a high voltage battery according to the related art includes a battery management system (BMS) and a cooling fan motor controller. The cooling fan motor controller receives control factors, conditions, and the like, of a cooling fan motor from the BMS through controller area network (CAN) communication to control the cooling fan motor.

The system of cooling a high voltage battery according to the related art includes a back-up controller disposed in the cooling fan motor controller in order to prepare for a case in which an error is generated in the CAN communication. However, since the back-up controller controls the cooling fan motor simply on the basis of an ignition 1 (ING 1) signal indicating whether or not the ignition of the vehicle is turned on, efficiency is low.

Particularly, when the cooling fan motor is controlled without considering whether or not an air conditioner in the vehicle is operated, a heat generation amount of the high voltage battery is overlooked due to characteristics of the air conditioner requiring a large amount of power, which may be a factor of shortening a lifespan of the high voltage battery.

SUMMARY

The present disclosure has been made to solve the above-mentioned problems occurring in the prior art while advantages achieved by the prior art are maintained intact.

An aspect of the present disclosure provides a system and a method of cooling a high voltage battery capable of maintaining a heat generation level of the high voltage battery in an optimal state by controlling a cooling fan motor on the basis of information on ignition of a vehicle and information on an operation of an air conditioner in the case in which an error is generated in controller area network (CAN) communication with a battery management system (BMS).

Objects of the present disclosure are not limited to the above-mentioned object, and other objects and advantages of the present disclosure that are not mentioned may be understood by the following description and will be more clearly appreciated by exemplary embodiments of the present disclosure. In addition, it may be easily appreciated that objects and advantages of the present disclosure may be realized by means mentioned in the claims and a combination thereof.

According to an exemplary embodiment of the present disclosure, a system of cooling a high voltage battery includes: an air conditioner pressure transducer (APT) configured to output a signal indicating whether or not ignition of a vehicle is turned on and whether or not an air conditioner is operated; a cooling fan motor configured to cool the high voltage battery of the vehicle; and a cooling fan motor controller configured to control the cooling fan motor on the basis of the output signal from the APT when an error is generated in CAN communication.

According to another exemplary embodiment of the present disclosure, a method of cooling a high voltage battery includes: outputting, by an air conditioner pressure transducer (APT), a signal indicating whether or not ignition of a vehicle is turned on and whether or not an air conditioner is operated; controlling, by a cooling fan motor controller, a cooling fan motor on the basis of the output signal from the APT when an error is generated in CAN communication; and cooling, by the cooling fan motor, the high voltage battery of the vehicle.

BRIEF DESCRIPTION OF THE DRAWINGS

The above and other objects, features and advantages of the present disclosure will be more apparent from the following detailed description taken in conjunction with the accompanying drawings.

FIG. 8 is an operation table illustrating each mode according to another exemplary embodiment of the present disclosure.

DETAILED DESCRIPTION

The above-mentioned objects, features, and advantages will become more obvious from the following description described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

Figure 1:
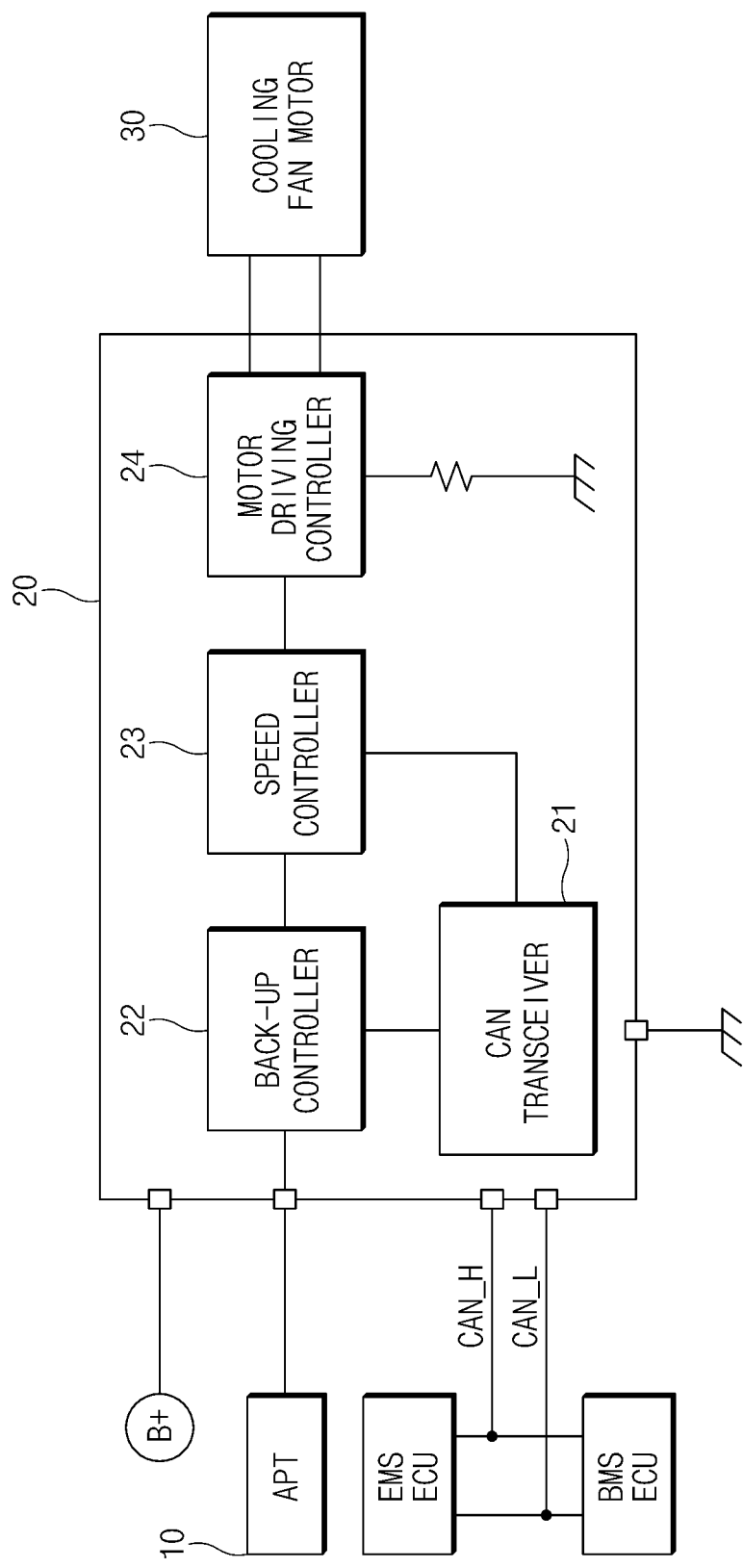
FIG. 1 is a block diagram illustrating a system of cooling a high voltage battery according to an exemplary embodiment of the present disclosure.

FIG. 1 is a block diagram illustrating a system of cooling a high voltage battery according to an exemplary embodiment of the present disclosure.

As illustrated in FIG. 1, the system of cooling a high voltage battery according to an exemplary embodiment of the present disclosure is configured to include an air conditioner pressure transducer (APT) 10, a cooling fan motor controller 20, and a cooling fan motor 30.

The above-mentioned respective components will be described. First, the APT 10 outputs a signal indicating whether or not ignition of a vehicle is turned on and whether or not an air conditioner is operated.

Figure 2:
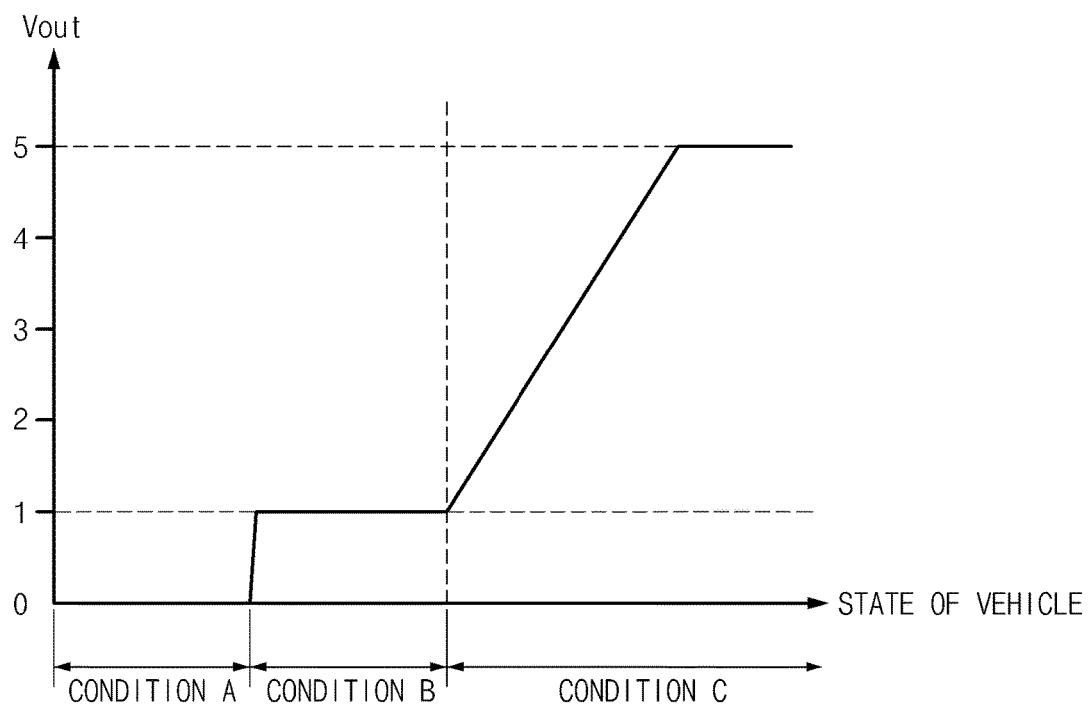
FIG. 2 is a graph illustrating an output signal of an air conditioner pressure transducer (APT) according to an exemplary embodiment of the present disclosure.

Referring to FIG. 2, an output signal Vout of the APT 10 has different output voltages representing one of a condition A, a condition B, and a condition C depending on a state of the vehicle.

That is, in the condition A, which is a state in which the ignition of the vehicle is turned off or a connection line is disconnected, the output voltage Vout is 0V as an example.

A first signal corresponding to the condition B is a signal indicating that the ignition of the vehicle is in a turn-on state and an operation of the air conditioner is in a turn-off state, and the output voltage Vout of the first signal is 1V as an example.

A second signal corresponding to the condition C is a signal indicating that the ignition of the vehicle is in a turn-on state and an operation of the air conditioner is in a turn-on state, and the output voltage Vout of the second signal exceeds 1V and is 5V or less as an example.

Next, the cooling fan motor controller 20 controls the cooling fan motor 30 on the basis of the output signal from the APT 10 in the case in which an error is generated in controller area network (CAN) communication.

That is, the cooling fan motor controller 20 sets a speed of the cooling fan motor 30 to a reference speed when the output signal is the first signal. Here, the reference speed is a speed in which an operation of the air conditioner is not considered.

The cooling fan motor controller 20 sets the speed of the cooling fan motor 30 to 120% of the reference speed as an example when the output signal is the second signal. This corresponds to the case of a system in which some of cool air generated by the operation of the air conditioner is not used to cool the high voltage battery. In the case of a system in which some of cool air generated by the operation of the air conditioner is used to cool the high voltage battery, the cooling fan motor controller 20 sets the speed of the cooling fan motor 30 to 80% of the reference speed as an example.

The cooling fan motor controller 20 includes a CAN transceiver 21, a back-up controller 22, a speed controller 23, and a motor driving controller 24.

The CAN transceiver 21 receives control factors, conditions, and the like, of the cooling fan motor 30 from a battery management system electronic control unit (BMS ECU).

The back-up controller 22 transfers the output signal from the APT 10 to the speed controller 23 when an error is generated in the CAN transceiver 21.

The speed controller 23 sets the speed of the cooling fan motor 30 on the basis of the output signal transferred through the back-up controller 22.

The motor driving controller 24 drives the cooling fan motor 30 at the speed set by the speed controller 23.

Next, the cooling fan motor 30 serves to cool a high voltage battery of an environmentally-friendly vehicle under a control of the cooling fan motor controller 20.

Figure 3:
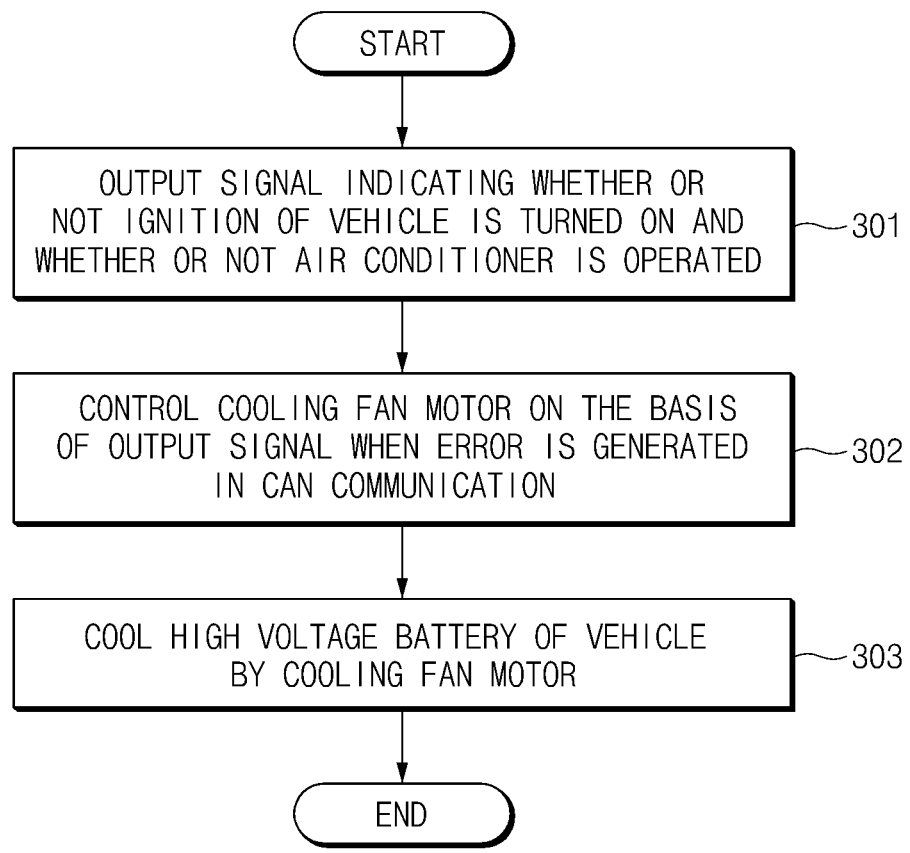
FIG. 3 is a flow chart illustrating a method of cooling a high voltage battery according to an exemplary embodiment of the present disclosure.

FIG. 3 is a flow chart illustrating a method of cooling a high voltage battery according to an exemplary embodiment of the present disclosure.

First, the APT 10 outputs the signal indicating whether or not the ignition of the vehicle is turned on and whether or not the air conditioner is operated (301).

Then, the cooling fan motor controller 20 controls the cooling fan motor 30 on the basis of the output signal from the APT 10 (302) when the error is generated in the CAN communication.

Then, the cooling fan motor 30 cools the high voltage battery of the vehicle under the control of the cooling fan motor controller 20 (303).

In the method of cooling a high voltage battery according to an exemplary embodiment of the present disclosure, a heat generation level of the high voltage battery may be maintained at an optimal state through the above-mentioned process.

Figure 4:
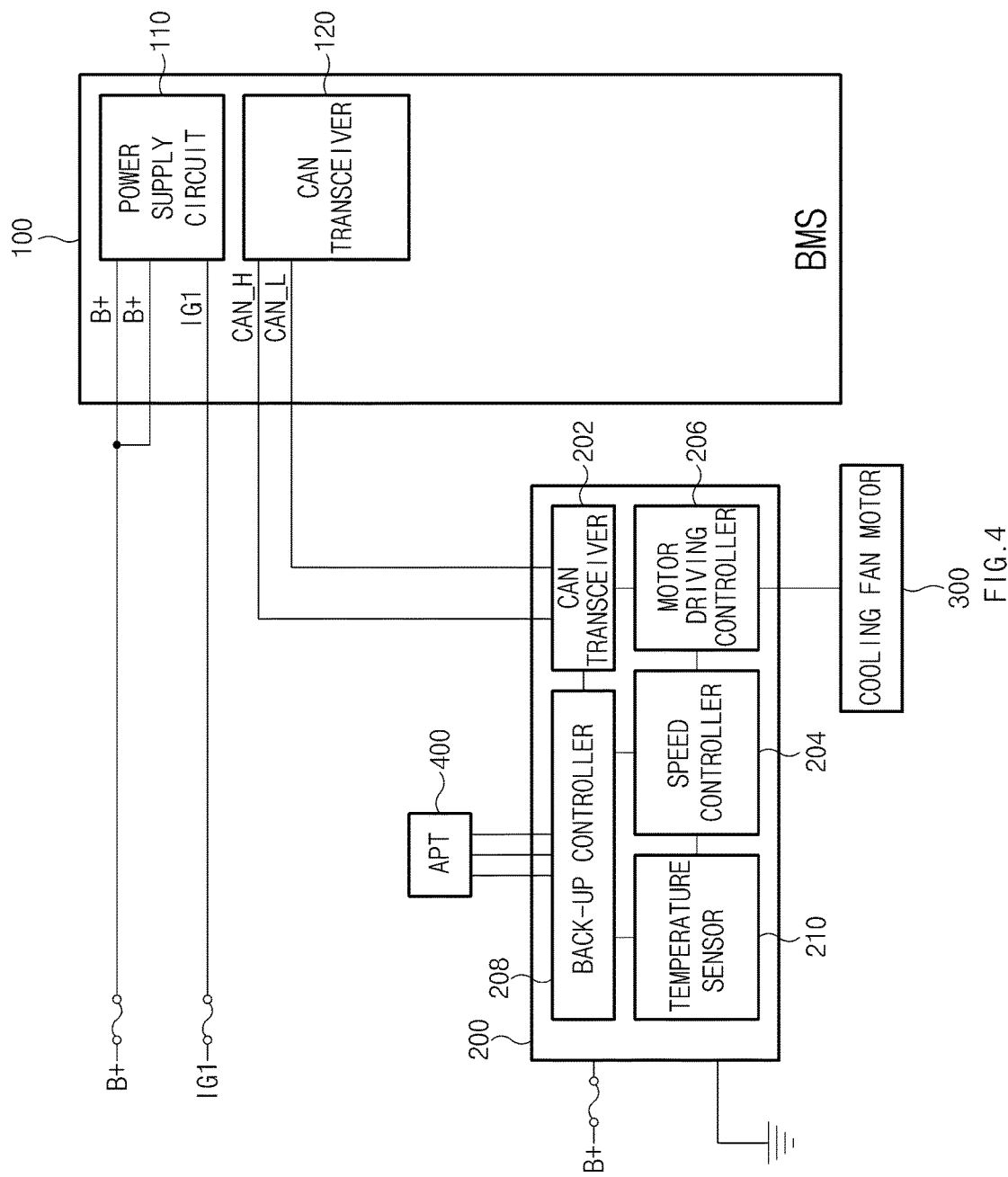
FIG. 4 is a block diagram illustrating a system of cooling a high voltage battery according to another exemplary embodiment of the present disclosure.

FIG. 4 is a block diagram illustrating a system of cooling a high voltage battery according to another exemplary embodiment of the present disclosure.

The system of cooling a high voltage battery according to another exemplary embodiment of the present disclosure is configured to include a BMS 100, a cooling fan motor controller 200, a cooling fan motor 300, and an APT 400.

The BMS 100 manages a state of the battery, and provides information on an operation condition of the cooling fan motor controller 200 through CAN communication when the ignition of the vehicle is turned on, such that an ignition signal IG1 is input. Here, the BMS 100 transmits a control condition of the cooling fan motor 300 to the cooling fan motor controller 200 through a CAN transceiver 120, and receives and monitors a control process for the cooling fan motor 300 from the cooling fan motor controller 200.

To this end, the BMS 100 includes a power supply circuit 110 and the CAN transceiver 120. The power supply circuit 110 is connected to a battery voltage terminal. The CAN transceiver 120 connects the BMS 100 and the cooling fan motor controller 200 to each other so that communication therebetween is possible through a CAN communication line unlike an existing wired wire connecting the BMS 100 and the cooling fan motor controller 200 to each other.

Figure 5:
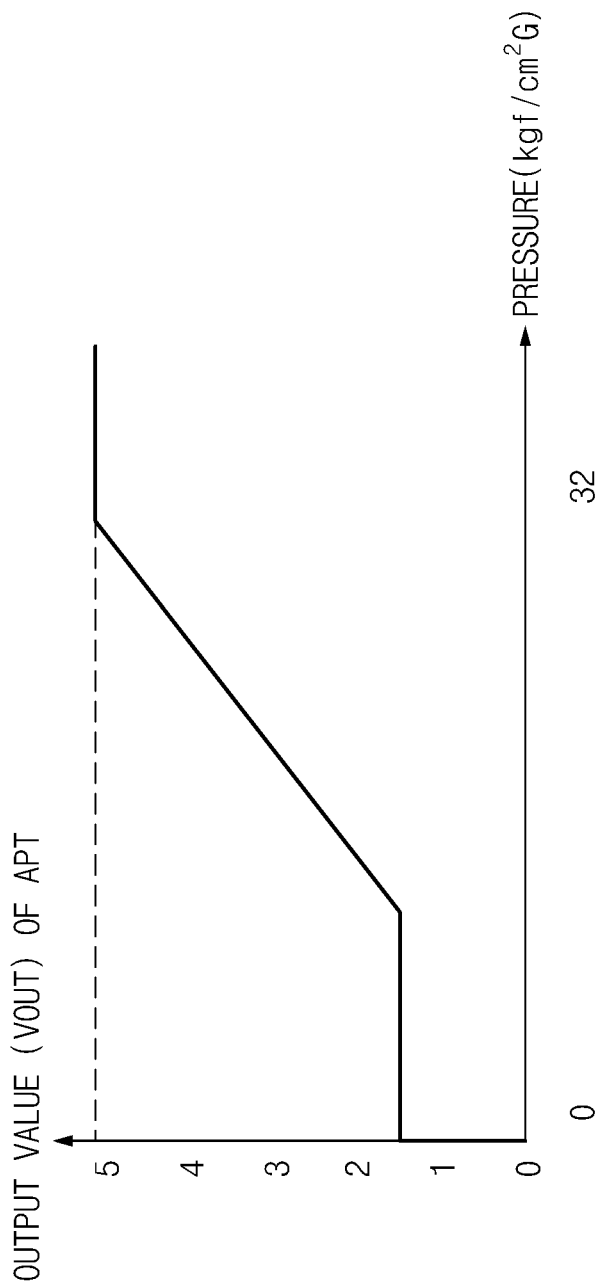
FIG. 5 is a graph illustrating an output value of an APT according to another exemplary embodiment of the present disclosure.

An output value of the APT 400 is a signal indicating a current state of the vehicle. Here, the output value of the APT has a voltage level between 1.5V and 5V, as illustrated in FIG. 5.

The cooling fan motor controller 200 receives control factors and conditions (for example, a battery temperature, a motor temperature, a vehicle speed, a motor revolution per minute (RPM) range for each battery temperature, and the like) of the cooling fan motor 300 from the BMS 100 to perform speed and driving controls of the cooling fan motor 300. In addition, the cooling fan motor controller 200 is directly in charge of a general control for the cooling fan motor 300, such as a back-up control allowing a control for the cooling fan motor 300 to be continued for a predetermined time when an error is generated in CAN communication with the BMS 100.

To this end, the cooling fan motor controller 200 according to an exemplary embodiment of the present disclosure includes a CAN transceiver 202 transmitting and receiving the control conditions of the cooling fan motor 300 to and from the BMS 100, a speed controller 204 controlling an RPM of the cooling fan motor 300 depending on the control conditions of the cooling fan motor 300, a motor driving controller 206 driving the cooling fan motor 300 depending on a speed signal of the speed controller 204, a back-up controller 208 controlling the cooling fan motor 300 using the output value of the APT 400 when the error is generated in the CAN communication with the BMS 100, and a temperature sensor 210 sensing a temperature of the battery.

The back-up controller 208 receives back-up power at the time of sensing the error in the CAN communication to temporarily control the speed controller 204 and the motor driving controller 206 by a back-up signal.

Preferably, in the case in which the error is generated in a CAN communication line through which the control factors, condition, and the like, of the cooling fan motor 300 are transferred from the BMS 100 to the cooling fan motor controller 200, the back-up controller 208 senses the output value of the APT 400 and determines whether the output value of the APT 400 is a first condition (for example, 1.5V to 4V) or a second condition (for example, 0V or 5V).

In the case in which the output value of the APT 400 is the first condition (1.5V to 4V), the back-up controller 208 is driven in a mode A or a mode B illustrated in a table of FIG. 8 to control the motor driving controller 206 to maintain a cooling fan motor control voltage or increase the cooling fan motor control voltage by, for example, 10%.

Meanwhile, in the case in which the output value of the APT 400 is the second condition (0V or 5V), the back-up controller 208 enters a C mode in the table of FIG. 8 to control the motor driving controller 206 so that the cooling fan motor control voltage increased from the previously output cooling fan motor control voltage by, for example, 150% is output. Here, referring to FIGS. 6 and 7, it may be appreciated that a higher cooling fan motor control voltage is output in the mode C than in the modes A and B.

The back-up controller 208 senses a cooling fan output and a temperature sensor signal to determine whether or not a fault is generated in the temperature sensor, in the case in which the output value of the APT is the second condition (0V or 5V). The back-up controller 208 controls the speed controller 204 to output the cooling fan motor control voltage as large as possible and outputs a warning to an instrument panel (not illustrated), in the case in which the fault is generated in the temperature sensor.

Meanwhile, in the case in which an error is generated in an operation of the cooling fan motor 300 due to a motor stall, a fault of a field effect transistor (FET) element and a motor shaft position sensor, a fault of the temperature sensor 210, or the like, a warning means (for example, a cluster) warning a driver that the error is generated in the cooling fan motor 300 may be connected to the cooling fan motor controller 200 through the CAN communication line so as to warn the driver that the error is generated in the cooling fan motor 300.

As described above, in the present disclosure, it is sensed whether or not the error is generated in the CAN communication, and the control voltage for driving the cooling fan motor 300 depending on the output value of the APT is adjusted and output in the case in which the error is generated in the CAN communication, thereby making it possible to stably perform a cooling control operation.

In addition, in the present disclosure, the cooling fan motor controller 200 is directly in charge of speed and driving controls for the cooling fan motor 300, such that the cooling fan may continuously cool the battery depending on driving of the cooling fan motor 300, and components such as an existing printed circuit board (PCB) type motor speed sensor, a relay, and the like, are excluded, thereby making it possible to decrease a cost and remove noise due to turn-on/off of the relay.

Figure 9:
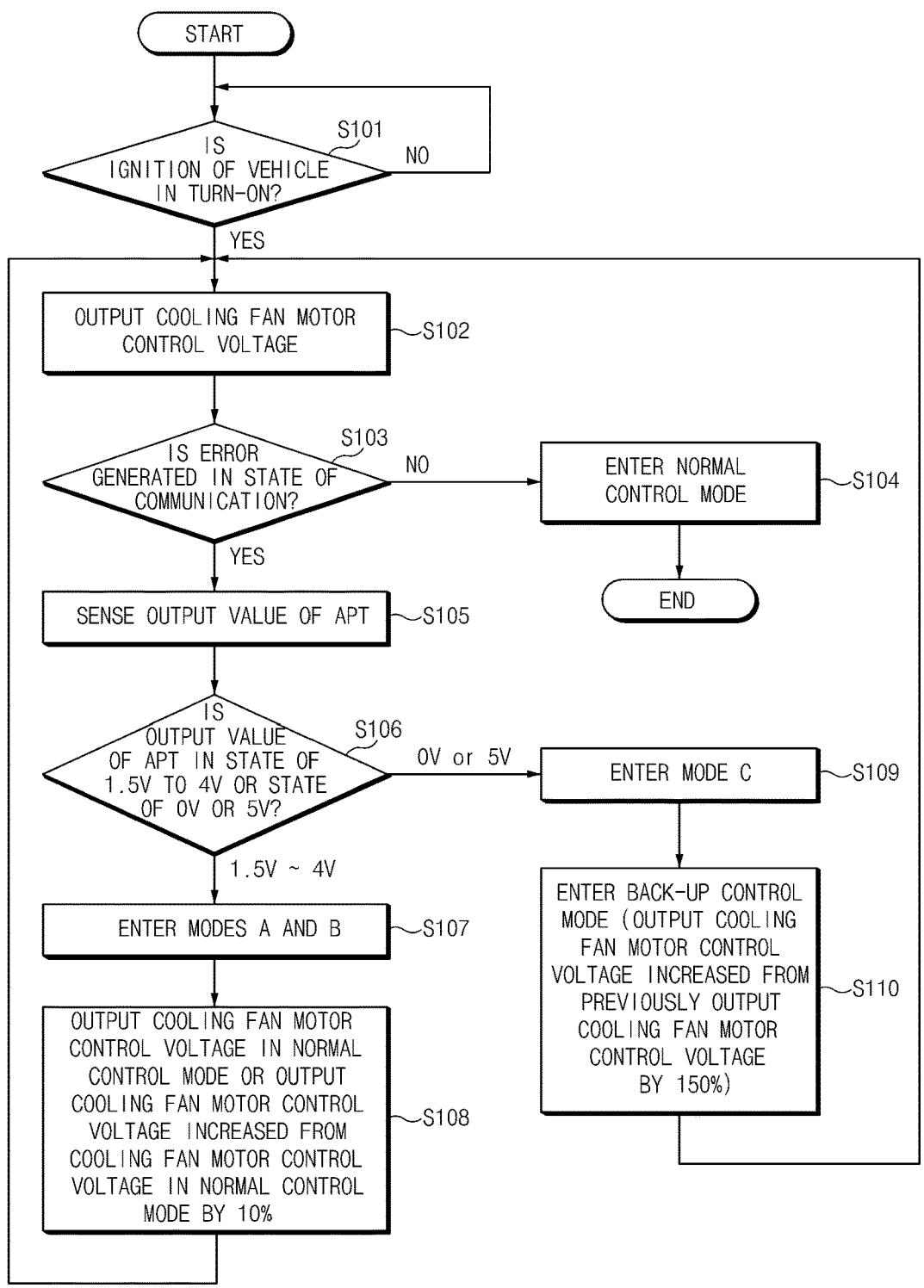
FIG. 9 is a flow chart illustrating a method of cooling a high voltage battery according to another exemplary embodiment of the present disclosure.

Hereinafter, a method of cooling a high voltage battery according to another exemplary embodiment of the present disclosure will be described in detail with reference to FIG. 9.

First, the cooling fan motor controller 200 determines whether or not the ignition of the vehicle is currently in a turn-on state through interworking with the BMS 100 (S101), and outputs the cooling fan motor control voltage (S102) in the case in which the ignition of the vehicle is in the turn-on state. Here, the cooling fan motor controller 200 may output the cooling fan motor control voltage using the control conditions (for example, the battery temperature, the motor temperature, the vehicle speed, the motor RPM range for each battery temperature, and the like) of the cooling fan motor 300 received from the BMS 100 through the CAN communication. That is, the speed controller 204 controls an RPM of the cooling fan motor 300 to be a predetermined speed depending on the control conditions of the cooling fan motor 300, and the motor driving controller 206 controls the cooling fan motor 300 to be driven at the predetermined speed. Here, the RPM of the cooling fan motor 300 may be measured through a general sensorless algorithm and be utilized as a control factor of the speed controller 204.

Then, the back-up controller 208 determines whether or not the error is generated in a state of the CAN communication with the BMS 100 (S103), and is driven in a normal control mode (S104) in the case in which the state of the CAN communication is normal.

In the case in which the error is generated in the state of the CAN communication in S103, the back-up controller 208 senses the output value of the APT 400 (S105), and determines whether the output value of the APT 400 is the first condition (1.5V to 4V) or the second condition (0V or 5V) (S106).

Figure 6:
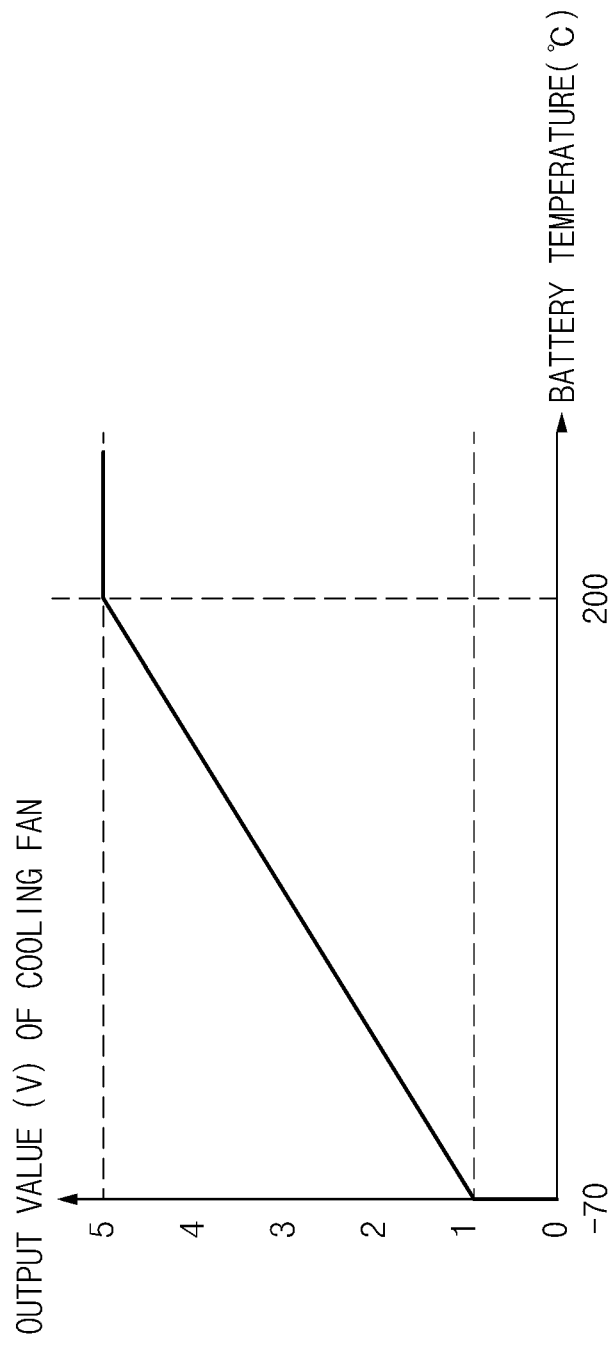
FIG. 6 is a graph illustrating an output value of a cooling fan at each battery temperature in modes A and B according to another exemplary embodiment of the present disclosure.

In the case in which the output value of the APT 400 is the first condition (1.5V to 4V), the back-up controller 208 is driven in the mode A or the mode B illustrated in the table of FIG. 8 (S107). The back-up controller 208 controls the motor driving controller 206 to output a cooling fan motor control voltage that is the same as that a cooling fan motor control voltage in the normal control mode of S104 to the cooling fan motor 300 or output a control voltage increased from the cooling fan motor control voltage in the normal control mode by 10% to the cooling fan motor 300 (S108). Here, FIG. 6 is a graph illustrating an output value of a cooling fan at each battery temperature in modes A and B according to another exemplary embodiment of the present disclosure.

Figure 7:
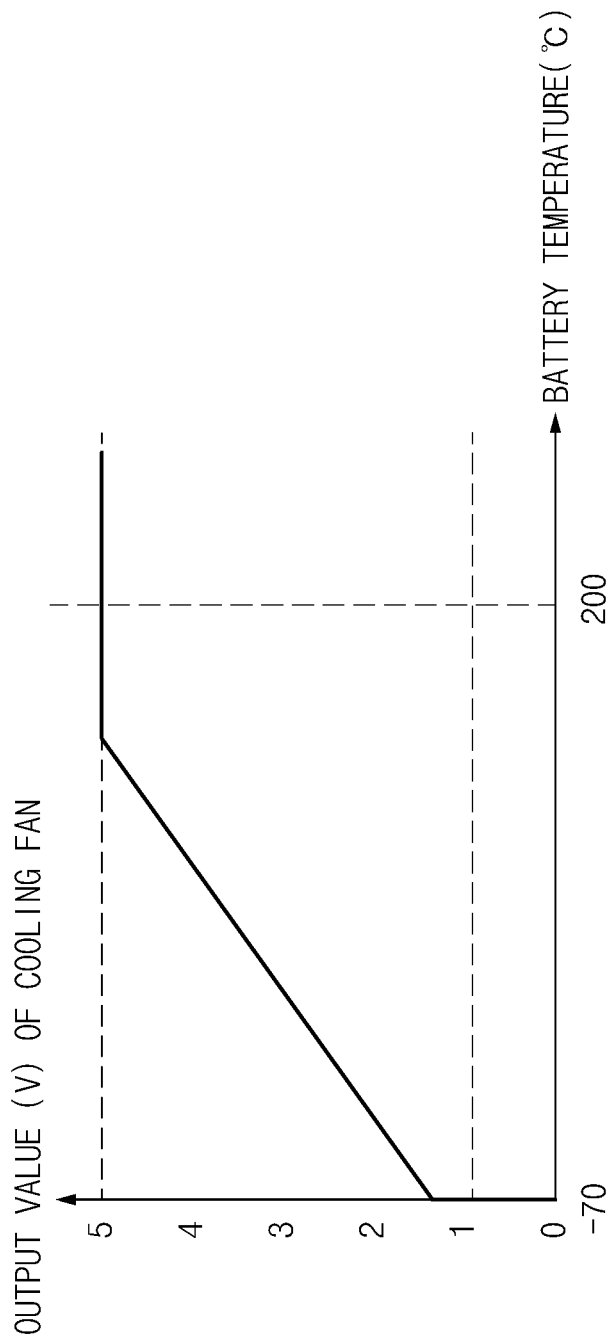
FIG. 7 is a graph illustrating an output value of a cooling fan at each battery temperature in a mode C according to another exemplary embodiment of the present disclosure.

Meanwhile, in the case in which the output value of the APT is 0V or 5V in S106, the back-up controller 208 enters the mode C of FIG. 8 (S109). Here, the case in which the output value of the APT is 0V or 5V corresponds to a state in which an output circuit of the APT is opened or short-circuited, that is, an error state. Therefore, the back-up controller 208 controls the motor driving controller 206 so that the cooling fan motor control voltage increased from the previously output cooling fan motor control voltage by 150% is output (S110). Here, FIG. 7 is a graph illustrating an output value of a cooling fan at each battery temperature in a mode C according to another exemplary embodiment of the present disclosure. As illustrated in FIG. 7, it may be appreciated that a higher cooling fan motor control voltage is output in the mode C than in the modes A and B.

Figure 10:
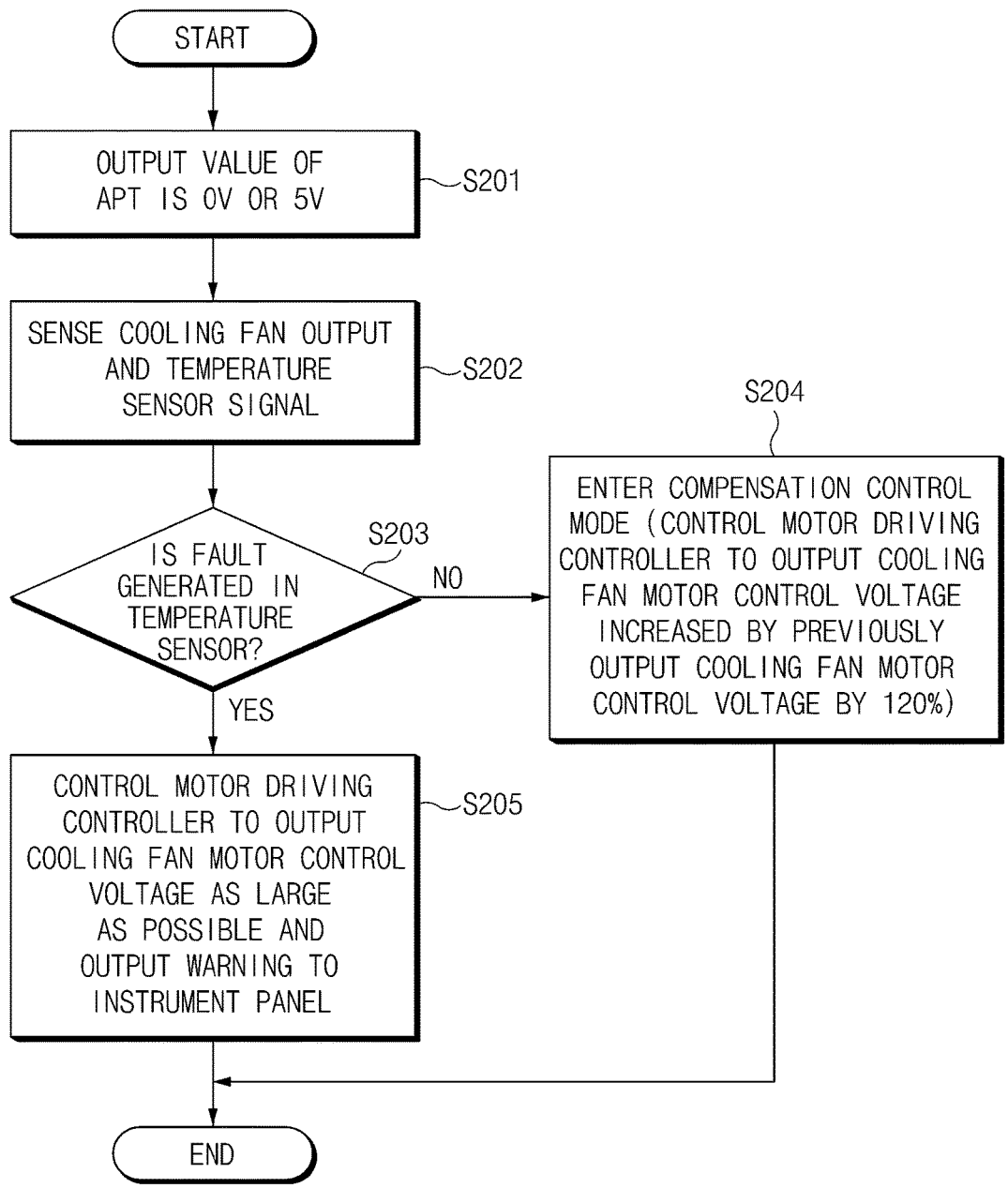
FIG. 10 is a flow chart illustrating a method of cooling a high voltage battery in the case in which a fault of a temperature sensor is considered before entering a mode C in FIG. 9.

Hereinafter, a method of cooling a high voltage battery in the case in which a fault of a temperature sensor is considered before entering a mode C in FIG. 9 will be described in detail with reference to FIG. 10.

In the case in which the output value of the APT is 0V or 5V (S201), the back-up controller 208 senses the cooling fan output and the temperature sensor signal (S202).

Therefore, the back-up controller 208 determines whether or not the fault is generated in the temperature sensor (S203), and in the case in which the fault is not generated in the temperature sensor 210, the back-up controller 208 enters a compensation control mode to control the motor driving controller 206 to output the cooling fan motor control voltage increased by the previously output cooling fan motor control voltage by 120% (S204).

Meanwhile, in the case in which the fault is generated in the temperature sensor 210, the back-up controller 208 controls the motor driving controller 206 to output the cooling fan motor control voltage as large as possible and outputs a warning to the instrument panel (not illustrated).

Meanwhile, the method of cooling a high voltage battery according to an exemplary embodiment of the present disclosure as described above may be implemented by a computer program. In addition, codes and code segments configuring the computer program may be easily inferred by a computer programmer skilled in the art. Further, the computer program is stored in a computer-readable recording medium (information storing medium) and is read and executed by a computer to implement the method of cooling a high voltage battery according to an exemplary embodiment of the present disclosure. In addition, the computer-readable recording medium includes all types of recording media that may be read by the computer.

As described above, according to exemplary embodiments of the present disclosure, in the case in which the error is generated in the CAN communication with the BMS, the cooling fan motor is controlled on the basis of information on the ignition of the vehicle and information on the operation of the air conditioner, thereby making it possible to maintain a heat generation level of the high voltage battery in an optimal state.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system of cooling a high voltage battery of a vehicle, comprising:
an air conditioner pressure transducer (APT) configured to output a signal simultaneously indicating whether or not ignition of a vehicle is turned on and whether or not an air conditioner is operated;
a cooling fan motor configured to cool the high voltage battery of the vehicle; and
a cooling fan motor controller configured to control the cooling fan motor on the basis of the output signal from the APT when an error is generated in a controller area network (CAN) transceiver.

2. The system of cooling a high voltage battery according to claim 1, wherein the cooling fan motor controller includes:
a back-up controller configured to transfer the output signal from the APT to a speed controller when an error is generated in the CAN transceiver;
the speed controller configured to set a speed of the cooling fan motor on the basis of the output signal transferred from the back-up controller; and
a motor driving controller configured to drive the cooling fan motor at the speed set by the speed controller.

3. The system of cooling a high voltage battery according to claim 2, wherein the speed controller sets the speed of the cooling fan motor to be lower than a reference speed when some of cool air generated by the air conditioner is used to cool the high voltage battery.

4. The system of cooling a high voltage battery according to claim 2, wherein the speed controller sets the speed of the cooling fan motor to be higher than a reference speed when some of cool air generated by the air conditioner is not used to cool the high voltage battery.

5. The system of cooling a high voltage battery according to claim 1, wherein the output signal is any one of a first signal indicating that the ignition of the vehicle is in a turn-on state and the air conditioner is in a turn-off state and a second signal indicating that the ignition of the vehicle is in a turn-on state and the air conditioner is in a turn-on state.

6. The system of cooling a high voltage battery according to claim 1, wherein the cooling fan motor controller includes:
a temperature sensor configured to sense a temperature of the high voltage battery;
a CAN transceiver;
a back-up controller configured to transfer the output signal from the APT to a speed controller when an error is generated in the CAN transceiver;
the speed controller configured to set a speed of the cooling fan motor on the basis of the output signal transferred from the back-up controller and the temperature sensed by the temperature sensor; and
a motor driving controller configured to drive the cooling fan motor at the speed set by the speed controller.

7. The system of cooling a high voltage battery according to claim 6, wherein the back-up controller controls the speed controller to set the speed of the cooling fan motor to a reference speed or increase the speed of the cooling fan motor from the reference speed by one level when a voltage of the output signal satisfies a first condition.

8. The system of cooling a high voltage battery according to claim 6, wherein the back-up controller controls the speed controller to increase the speed of the cooling fan motor by two levels when a voltage of the output signal satisfies a second condition.

9. The system of cooling a high voltage battery according to claim 8, wherein the back-up controller controls the speed controller to increase the speed of the cooling fan motor to maximum when the voltage of the output signal satisfies the second condition and a fault is generated in the temperature sensor.

10. A method of cooling a high voltage battery of a vehicle, comprising:
   outputting, by an air conditioner pressure transducer (APT), a signal simultaneously indicating whether or not ignition of the vehicle is turned on and whether or not an air conditioner is operated;
   controlling, by a cooling fan motor controller, a cooling fan motor on the basis of the output signal from the APT when an error is generated in a CAN transceiver; and
   cooling, by the cooling fan motor, the high voltage battery of the vehicle.

11. The method of cooling a high voltage battery according to claim 10, wherein the controlling of the cooling fan motor includes:
   transferring, by a back-up controller, the output signal from the APT to a speed controller when the error is generated in the CAN transceiver;
   setting, by the speed controller, a speed of the cooling fan motor on the basis of the transferred output signal; and
   driving, by a motor driving controller, the cooling fan motor at the set speed.

12. The method of cooling a high voltage battery according to claim 11, wherein in the setting of the speed of the cooling fan motor, the speed of the cooling fan motor is set to be lower than a reference speed when some of cool air generated by the air conditioner is used to cool the high voltage battery.

13. The method of cooling a high voltage battery according to claim 11, wherein in the setting of the speed of the cooling fan motor, the speed of the cooling fan motor is set to be higher than a reference speed when some of cool air generated by the air conditioner is not used to cool the high voltage battery.

14. The method of cooling a high voltage battery according to claim 10, wherein the output signal is any one of a first signal indicating that the ignition of the vehicle is in a turn-on state and the air conditioner is in a turn-off state and a second signal indicating that the ignition of the vehicle is in a turn-on state and the air conditioner is in a turn-on state.

15. The method of cooling a high voltage battery according to claim 10, wherein the controlling of the cooling fan motor includes:
   transferring, by a back-up controller, the output signal from the APT to a speed controller when the error is generated in the CAN transceiver;
   sensing, by a temperature sensor, a temperature of the high voltage battery;
   setting, by the speed controller, a speed of the cooling fan motor on the basis of the sensed temperature and the transferred output signal; and
   driving, by a motor driving controller, the cooling fan motor at the set speed.

16. The method of cooling a high voltage battery according to claim 11, wherein the setting of the speed of the cooling fan motor includes:
   setting the speed of the cooling fan motor to a reference speed or increasing the speed of the cooling fan motor from the reference speed by one level when a voltage of the output signal satisfies a first condition; and
   increasing the speed of the cooling fan motor by two levels when a voltage of the output signal satisfies a second condition.

17. The method of cooling a high voltage battery according to claim 16, wherein in the setting of the speed of the cooling fan motor, the speed of the cooling fan motor is increased to maximum when the voltage of the output signal satisfies the second condition and a fault is generated in a temperature sensor.

18. The method of cooling a high voltage battery according to claim 17, wherein the controlling of the cooling fan motor further includes warning a driver that the fault is generated in the temperature sensor when the fault is generated in the temperature sensor.

* * * * *